(12) United States Patent
Sugiura (10) Patent No.: US 8,704,491 B2
(45) Date of Patent: Apr. 22, 2014

(54) BATTERY PACK (75) Inventor: Masakazu Sugiura, Chiba (JP)

(73) Assignee: Seiko Instruments Inc. (JP)

( * ) Notice: Subject to any disclaimer, the term of this patent is extended or adjusted under 35 U.S.C. 154(b) by 277 days.

(21) Appl. No.: 12/985,725

(22) Filed: Jan. 6, 2011

(65) Prior Publication Data

US 2011/0169458 A1    Jul. 14, 2011

(30) Foreign Application Priority Data

Jan. 8, 2010   (JP) ................................. 2010-003356

(51) Int. Cl.
H02J 7/00   (2006.01)
(52) U.S. Cl.
USPC ........................................................ 320/134
(58) Field of Classification Search
USPC .................. 320/132, 134, 135, 136
See application file for complete search history.

(56) References Cited

U.S. PATENT DOCUMENTS

| 6,930,467 B2 | 8/2005 | Suzuki | |
| 7,215,096 B2 * | 5/2007 | Miura et al. | 320/134 |
| 2009/0295332 A1 * | 12/2009 | Yang et al. | 320/132 |

FOREIGN PATENT DOCUMENTS

JP    2003-111284 A    4/2003

* cited by examiner

Primary Examiner — Edward Tso
Assistant Examiner — Ramy Ramadan
(74) Attorney, Agent, or Firm — Brinks Gilson & Lione (57) ABSTRACT Provided is a battery pack capable of reducing the number of terminals of a battery protection IC. When a battery (15) enters an overdischarge state, a temperature switch IC (12) included in a battery pack (10) monitors a voltage of a voltage monitoring terminal (VM2) provided to an external connection terminal (EB−), rather than a voltage of a terminal of the battery protection IC (11) for use in communication with the temperature switch IC (12), and then shuts down. Therefore, the battery protection IC (11) included in the battery pack (10) does not require an additional terminal for use in communication with the temperature switch IC (12).

9 Claims, 5 Drawing Sheets

BATTERY PACK

RELATED APPLICATIONS

This application claims priority under 35 U.S.C. §119 to Japanese Patent Application No. 2010-003356 filed on Jan. 8, 2010, the entire content of which is hereby incorporated by reference.

BACKGROUND OF THE INVENTION

1. Field of the Invention

The present invention relates to a battery pack including, in addition to a battery protection IC, a control IC for controlling the battery pack.

2. Description of the Related Art

Figure 5:
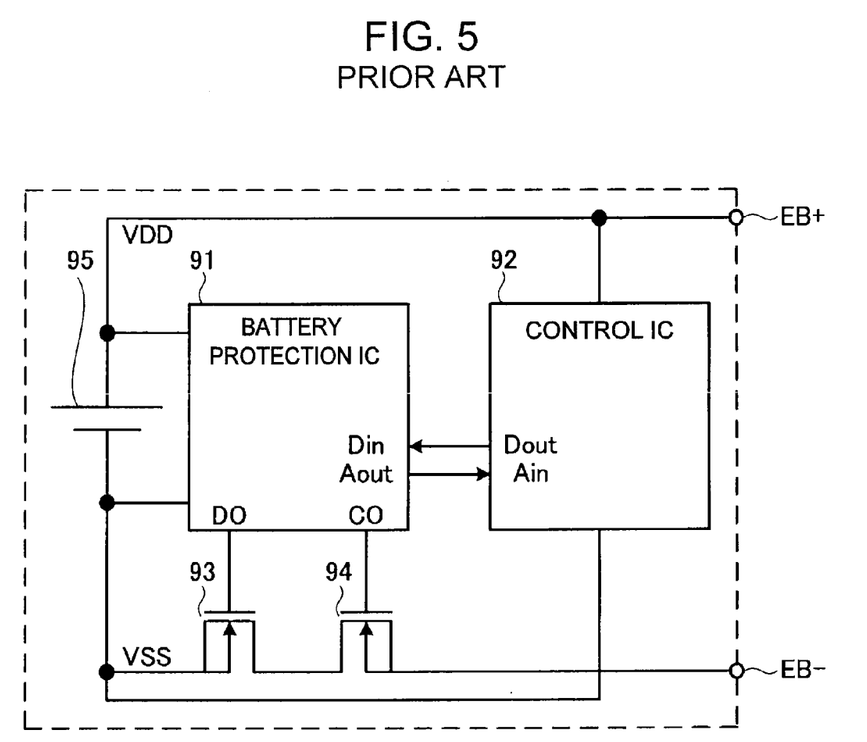
FIG. 5 is a block diagram illustrating a conventional battery pack.

A conventional battery pack is described. FIG. 5 is a block diagram illustrating the conventional battery pack.

A battery protection IC 91 controls N type FETs 93 and 94, respectively, based on a voltage of a battery 95. An overdischarge voltage indicating that the battery 95 is in an overdischarge state, an overcharge voltage indicating that the battery 95 is in an overcharge state, and a discharge overcurrent indicating that the battery 95 is in an overcurrent state during discharge are set therein in advance, and if the voltage of the battery 95 becomes equal to or lower than the overdischarge voltage, a voltage of a discharge control terminal DO is controlled to Low so that the N type FET 93 is turned OFF to stop the discharge from the battery 95. On the other hand, if the voltage of the battery 95 becomes equal to or higher than the overcharge voltage, a voltage of a charge control terminal CO is controlled to Low so that the N type FET 94 is turned OFF to stop the charge to the battery 95. Further, if a discharge current of the battery 95 becomes equal to or larger than the discharge overcurrent, the voltage of the discharge control terminal DO is controlled to Low so that the N type FET 93 is turned OFF to stop the discharge from the battery 95. A control IC 92 controls the battery protection IC 91 on a given occasion.

The battery protection IC 91 includes a terminal Din and a terminal Aout, which are for use in communication with the control IC 92. The control IC 92 includes a terminal Dout and a terminal Ain, which are for use in communication with the battery protection IC 91. The terminal Din and the terminal Dout are connected to each other, and the terminal Aout and the terminal Ain are connected to each other (see, for example, Japanese Patent Application Laid-open No. 2003-111284).

In the technology disclosed in Japanese Patent Application Laid-open No. 2003-111284, when the control IC 92 is controlled based on a state of the battery 95, the battery protection IC 91 detects the state of the battery 95 and sends a predetermined signal to the control IC 92 based on the detection result. In other words, in this case, the battery protection IC 91 requires the terminal Aout without exception. Accordingly, the number of terminals in the battery protection IC 91 is increased correspondingly.

SUMMARY OF THE INVENTION

The present invention has been made in view of the above-mentioned problem, and provides a battery pack capable of reducing the number of terminals in a battery protection IC.

In order to solve the above-mentioned problem, the present invention provides a battery pack including: a first external connection terminal and a second external connection terminal; a battery; a discharge control FET and a charge control FET which are disposed in series between the battery and the second external connection terminal; a battery protection IC for monitoring a voltage of the battery to detect that the voltage of the battery is equal to or lower than an overdischarge voltage, so as to turn OFF the discharge control FET and shut down, and for monitoring the voltage of the battery to detect that the voltage of the battery is equal to or higher than an overcharge voltage, so as to turn OFF the charge control FET; and a control IC for controlling the battery pack on a given occasion, the control IC including a second voltage monitoring terminal provided to the second external connection terminal, for monitoring a voltage of the second voltage monitoring terminal to detect that the battery enters an overdischarge state and then shut down.

According to the present invention, when the battery enters the overdischarge state, the control IC included in the battery pack monitors the voltage of the second voltage monitoring terminal provided to the second external connection terminal, rather than a voltage of a terminal of the battery protection IC for use in communication with the control IC, and then shuts down. Therefore, the battery protection IC included in the battery pack does not require an additional terminal for use in communication with the control IC.

DETAILED DESCRIPTION OF THE PREFERRED EMBODIMENTS

Now, referring to the accompanying drawings, an embodiment of the present invention is described. In this embodiment, a temperature switch IC is described as a typical example of a control IC. When temperature reaches to an abnormal temperature, the temperature switch IC controls a battery pack via a battery protection IC.

Figure 1:
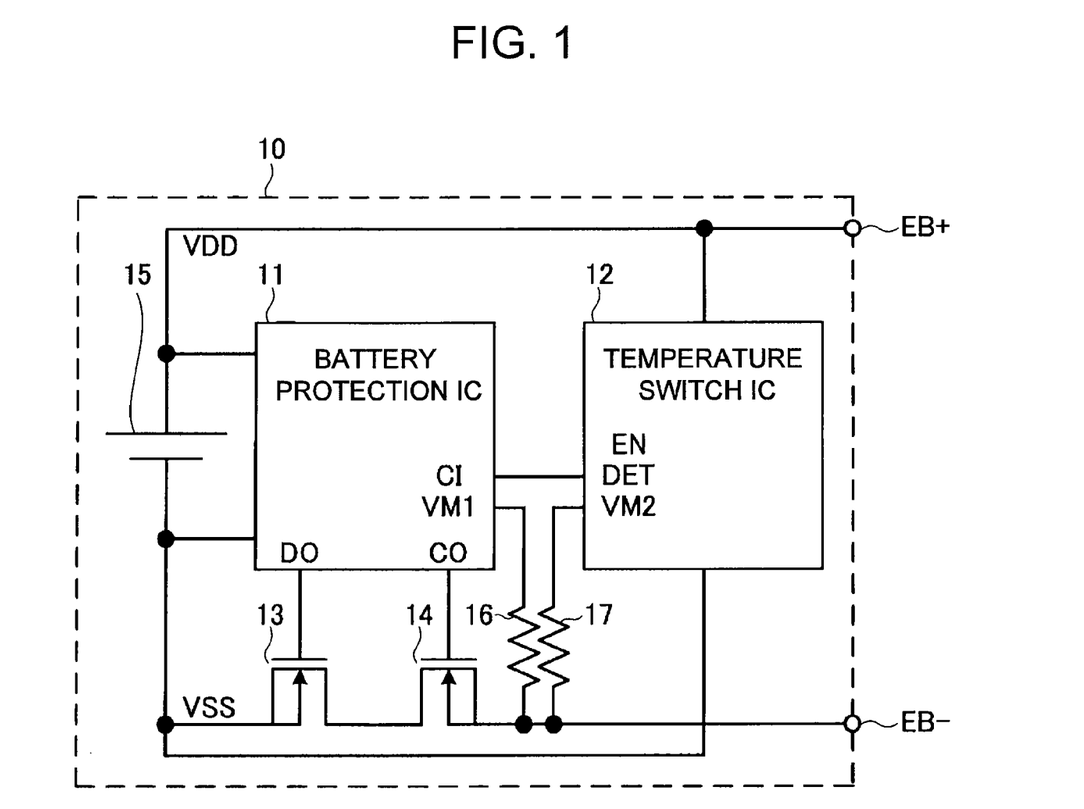
FIG. 1 is a block diagram illustrating a battery pack.
Figure 2:
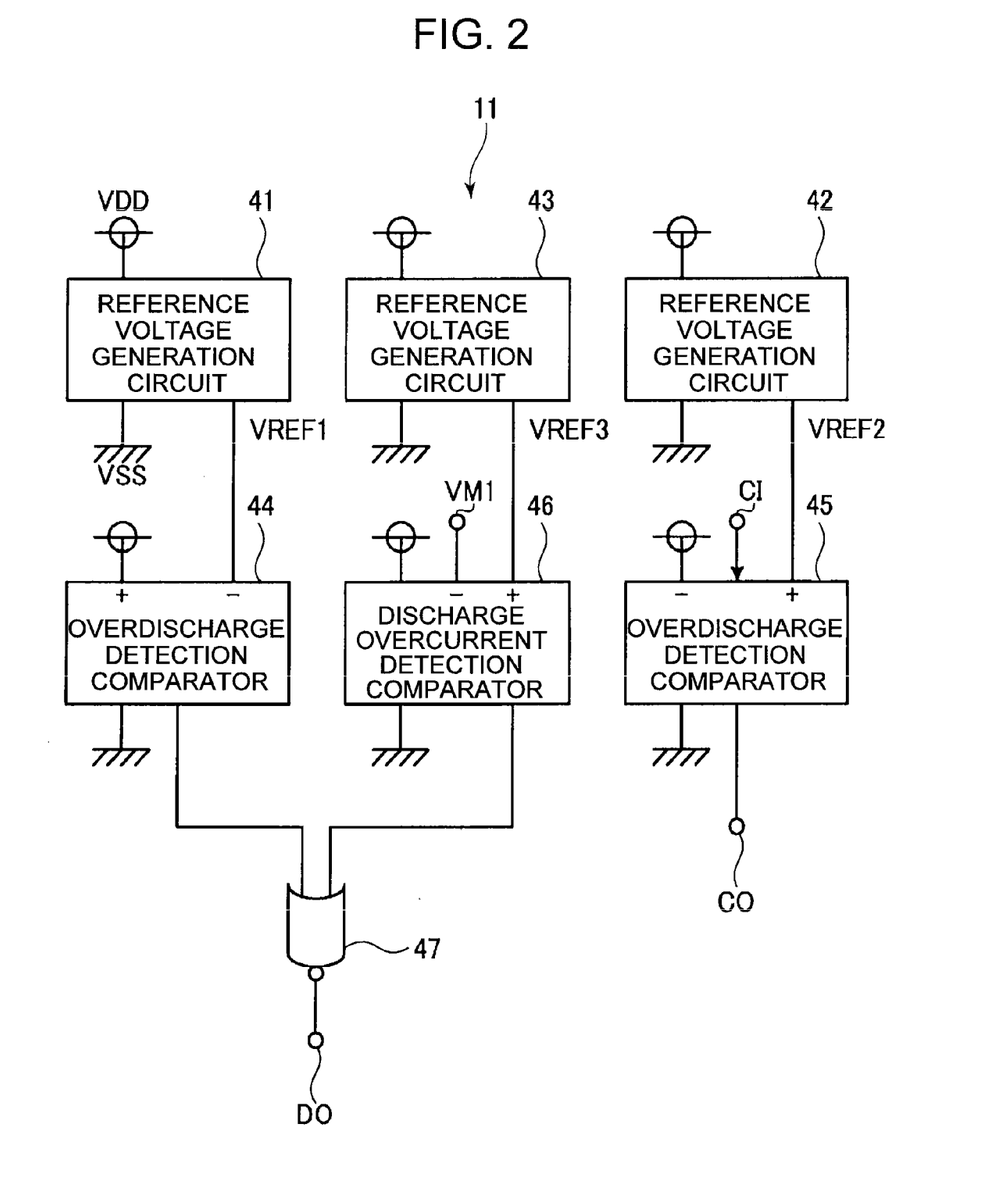
FIG. 2 is a block diagram illustrating a battery protection IC.
Figure 3:
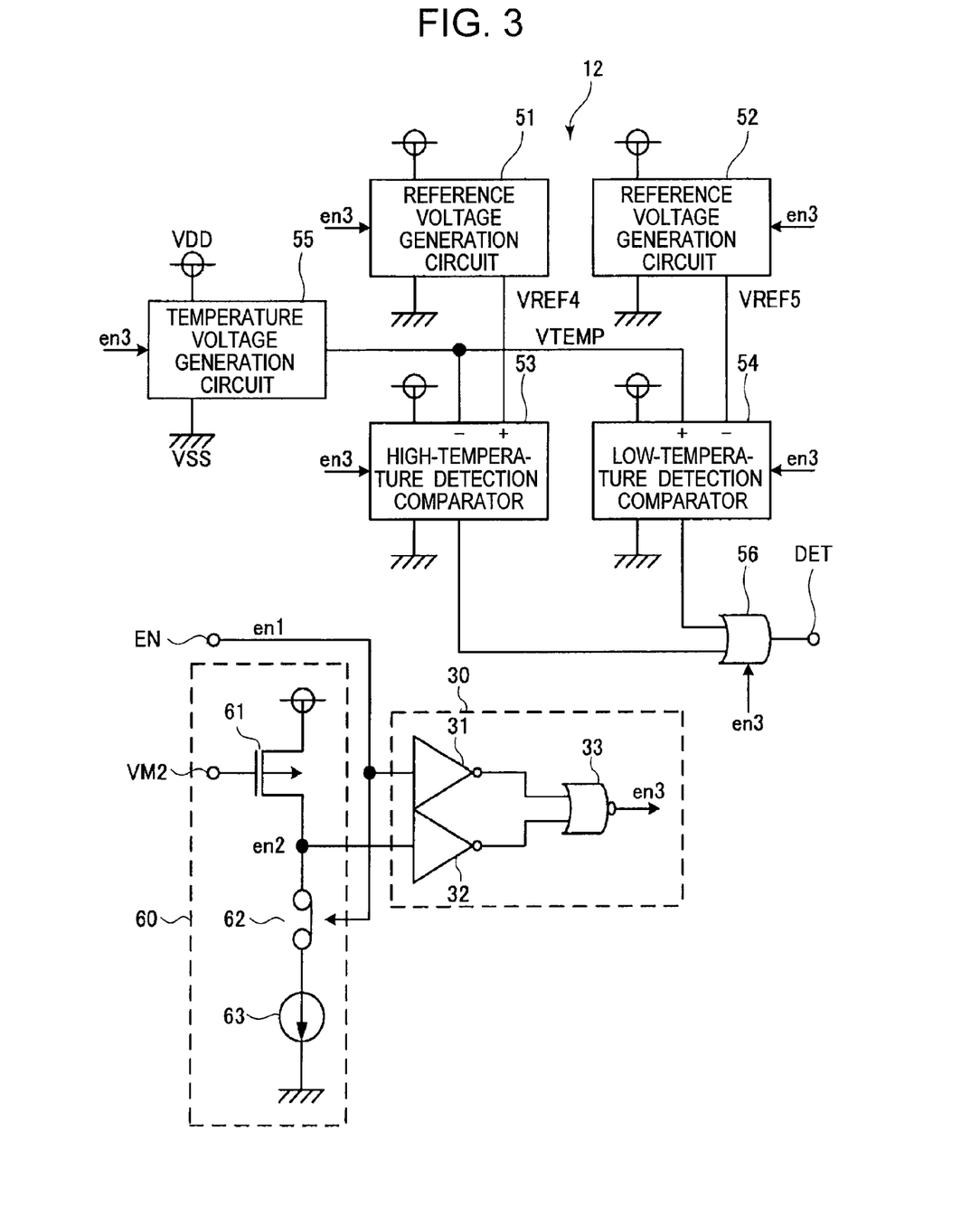
FIG. 3 is a block diagram illustrating a temperature switch IC.

First, a configuration of a battery pack according to the present invention is described. FIG. 1 is a block diagram illustrating the battery pack. FIG. 2 is a block diagram illustrating the battery protection IC. FIG. 3 is a block diagram illustrating the temperature switch IC.

As illustrated in FIG. 1, a battery pack 10 includes a battery protection IC 11, a temperature switch IC 12, N type FETs 13 and 14, a battery 15, and resistors 16 and 17. The battery pack 10 further includes an external connection terminal EB+ and an external connection terminal EB−.

As illustrated in FIG. 2, the battery protection IC 11 includes reference voltage generation circuits 41 to 43, an overdischarge detection comparator 44, an overcharge detection comparator 45, a discharge overcurrent detection comparator 46, and a NOR circuit 47. The battery protection IC 11 further includes a power supply terminal, a ground terminal, a charge control terminal CO, a discharge control terminal DO, a voltage monitoring terminal VM1, and a control terminal CI.

As illustrated in FIG. 3, the temperature switch IC 12 includes a temperature voltage generation circuit 55, reference voltage generation circuits 51 and 52, a high-temperature detection comparator 53, a low-temperature detection comparator 54, and an OR circuit 56. Although not illustrated, the temperature voltage generation circuit 55 is formed of a PNP bipolar transistor and the like. The temperature switch IC 12 further includes a power supply terminal, a ground terminal, and an output terminal DET. The temperature switch IC 12 still further includes a PMOS transistor 61, a switch 62, a resistive element 63, inverters 31 and 32, and a NOR circuit 33. The temperature switch IC 12 still further includes an enable terminal EN and a voltage monitoring terminal VM2. The PMOS transistor 61, the switch 62, and the resistive element 63 together form a comparator 60. The inverters 31 and 32 and the NOR circuit 33 together form a logic circuit 30.

In the battery protection IC 11, the power supply terminal is connected to a positive terminal of the battery 15, the ground terminal is connected to a negative terminal of the battery 15, the discharge control terminal DO is connected to a gate of the N type FET 13, the charge control terminal CO is connected to a gate of the N type FET 14, and the voltage monitoring terminal VM1 is connected to the external connection terminal EB− via the resistor 16. In the temperature switch IC 12, the power supply terminal is connected to the positive terminal of the battery 15, the ground terminal is connected to the negative terminal of the battery 15, the output terminal DET is connected to the control terminal CI of the battery protection IC 11, and the voltage monitoring terminal VM2 is connected to the external connection terminal EB− via the resistor 17.

The N type FET 13 has a source and a back gate which are connected to the negative terminal of the battery 15, and a drain connected to a drain of the N type FET 14. The N type FET 14 has a source and a back gate which are connected to the external connection terminal EB−. The external connection terminal EB+ is connected to the positive terminal of the battery 15.

The reference voltage generation circuits 41 to 43, the overdischarge detection comparator 44, the overcharge detection comparator 45, and the discharge overcurrent detection comparator 46 are each disposed between the power supply terminal and the ground terminal. The overdischarge detection comparator 44 has a non-inverting input terminal connected to the power supply terminal, an inverting input terminal connected to an output terminal of the reference voltage generation circuit 41, and an output terminal connected to a first input terminal of the NOR circuit 47. The overcharge detection comparator 45 has a non-inverting input terminal connected to an output terminal of the reference voltage generation circuit 42, an inverting input terminal connected to the power supply terminal, and an output terminal connected to the charge control terminal CO. Further, the overcharge detection comparator 45 is controlled by a voltage of the control terminal CI. The discharge overcurrent detection comparator 46 has a non-inverting input terminal connected to an output terminal of the reference voltage generation circuit 43, an inverting input terminal connected to the voltage monitoring terminal VM1, and an output terminal connected to a second input terminal of the NOR circuit 47. The NOR circuit 47 has an output terminal connected to the discharge control terminal DO.

The reference voltage generation circuits 51 and 52, the high-temperature detection comparator 53, the low-temperature detection comparator 54, and the temperature voltage generation circuit 55 are each disposed between the power supply terminal and the ground terminal. The high-temperature detection comparator 53 has a non-inverting input terminal connected to an output terminal of the reference voltage generation circuit 51 and an inverting input terminal connected to an output terminal of the temperature voltage generation circuit 55. The low-temperature detection comparator 54 has a non-inverting input terminal connected to the output terminal of the temperature voltage generation circuit 55 and an inverting input terminal connected to an output terminal of the reference voltage generation circuit 52. The OR circuit 56 has a first input terminal connected to an output terminal of the high-temperature detection comparator 53, a second input terminal connected to an output terminal of the low-temperature detection comparator 54, and an output terminal connected to the output terminal DET.

The inverter 31 has an input terminal connected to the enable terminal EN and an output terminal connected to a first input terminal of the NOR circuit 33. The inverter 32 has an input terminal connected to a connection point between a drain of the PMOS transistor 61 and the switch 62, and an output terminal connected to a second input terminal of the NOR circuit 33. The PMOS transistor 61 has a gate connected to the voltage monitoring terminal VM2 and a source connected to the power supply terminal. The resistive element 63 is disposed between the switch 62 and the ground terminal. An enable signal en1 from the enable terminal EN controls the switch 62. An enable signal en3 from an output terminal of the NOR circuit 33 controls the reference voltage generation circuits 51 and 52, the high-temperature detection comparator 53, the low-temperature detection comparator 54, the temperature voltage generation circuit 55, and the OR circuit 56.

The battery protection IC 11 monitors a voltage of the battery 15 and detects that the voltage of the battery 15 is equal to or lower than an overdischarge voltage. Then, the battery protection IC 11 turns OFF the N type FET 13 for discharge control, to thereby stop the discharge from the battery 15. At this time, the battery protection IC 11 shuts down. Further, the battery protection IC 11 monitors the voltage of the battery 15 and detects that the voltage of the battery 15 is equal to or higher than an overcharge voltage. Then, the battery protection IC 11 turns OFF the N type FET 14 for charge control, to thereby stop the charge to the battery 15. Still further, the battery protection IC 11 monitors a voltage of the voltage monitoring terminal VM1 and detects that a discharge current of the battery 15 is equal to or larger than a discharge overcurrent. Then, the battery protection IC 11 turns OFF the N type FET 13 for discharge control, to thereby stop the discharge from the battery 15.

If temperature reaches to at least one of an abnormal high temperature and an abnormal low temperature, the temperature switch IC 12 controls the battery pack 10 via the battery protection IC 11. Further, the temperature switch IC 12 monitors a voltage of the voltage monitoring terminal VM2, to thereby detect that the battery 15 is in an overdischarge state, and then shuts down.

Next, an operation of the battery pack 10 is described.
[Operation when Battery 15 is in Overdischarge State]

A load (not shown) is connected between the external connection terminal EB+ and the external connection terminal EB−. The reference voltage generation circuit 41 generates a reference voltage VREF1, which corresponds to the overdischarge voltage indicating that the battery 15 is in the overdischarge state. The overdischarge detection comparator 44 compares a divided voltage of the battery 15 with the reference voltage VREF1, and inverts an output voltage thereof depending on the comparison result. Specifically, if the divided voltage of the battery 15 becomes equal to or lower than the reference voltage VREF1, the overdischarge detection comparator 44 inverts the output voltage to High. Then, a voltage of the discharge control terminal DO becomes Low to turn OFF the N type FET 13, to thereby stop the discharge from the battery 15. Further, the battery protection IC 11 shuts down to prevent consumption of the battery 15.

On this occasion, the N type FET 13 is turned OFF to stop the discharge from the battery 15. Then, a voltage of the external connection terminal EB− is changed from around a ground voltage VSS to around a power supply voltage VDD due to the OFF-state N type FET 13 and the load. The voltage of the voltage monitoring terminal VM2 is also changed from around the ground voltage VSS to around the power supply voltage VDD, and in FIG. 3, a gate-source voltage of the PMOS transistor 61 becomes lower than its threshold voltage and the PMOS transistor 61 is turned OFF. At this time, if the enable signal en1 from the enable terminal EN is controlled to High, the switch 62 is turned ON and a node of an enable signal en2 is pulled down by the switch 62 and the resistive element 63 serving as a resistor or a current source, so that the enable signal en2 becomes Low. Accordingly, an output voltage of the inverter 31 is Low and an output voltage of the inverter 32 is High, and hence the enable signal en3 is Low. Then, the reference voltage generation circuits 51 and 52, the high-temperature detection comparator 53, the low-temperature detection comparator 54, the temperature voltage generation circuit 55, and the OR circuit 56, namely, the temperature switch IC 12 shuts down to prevent the consumption of the battery 15, similarly to the battery protection IC 11.

Note that, if the enable signal en1 from the enable terminal EN is controlled to Low from outside the temperature switch IC 12, the switch 62 is turned OFF. Further, if the N type FETs 13 and 14 are turned ON and the voltage of the voltage monitoring terminal VM2 is around the ground voltage VSS, the PMOS transistor 61 is turned ON so that the enable signal en2 becomes High. Accordingly, the output voltage of the inverter 31 is High and the output voltage of the inverter 32 is Low, and hence the enable signal en3 is Low. Then, the reference voltage generation circuits 51 and 52, the high-temperature detection comparator 53, the low-temperature detection comparator 54, the temperature voltage generation circuit 55, and the OR circuit 56, namely, the temperature switch IC 12 shuts down to prevent the consumption of the battery 15. At this time, because the switch 62 is turned OFF, no current flows through a current path leading to the resistive element 63 from the PMOS transistor 61 via the switch 62, with the result that the battery 15 is reduced in consumption correspondingly.

[Operation when Battery 15 is in Overcharge State]

A charger (not shown) is connected between the external connection terminal EB+ and the external connection terminal EB−. The reference voltage generation circuit 42 generates a reference voltage VREF2, which corresponds to the overcharge voltage indicating that the battery 15 is in an overcharge state. The overcharge detection comparator 45 compares the divided voltage of the battery 15 with the reference voltage VREF2, and inverts an output voltage thereof depending on the comparison result. Specifically, if the divided voltage of the battery 15 becomes equal to or higher than the reference voltage VREF2, the overcharge detection comparator 45 inverts the output voltage to Low. Then, a voltage of the charge control terminal CO becomes Low to turn OFF the N type FET 14, to thereby stop the charge to the battery 15.

[Operation when Battery 15 is in Overcurrent State During Discharge]

A load (not shown) is connected between the external connection terminal EB+ and the external connection terminal EB−. The reference voltage generation circuit 43 generates a reference voltage VREF3, which corresponds to the discharge overcurrent indicating that the battery 15 is in an overcurrent state during discharge. The voltage of the voltage monitoring terminal VM1 is determined substantially based on a discharge current flowing through the N type FETs 13 and 14 and a total ON-state resistance of the N type FETs 13 and 14. The discharge overcurrent detection comparator 46 compares the voltage of the voltage monitoring terminal VM1 with the reference voltage VREF3, and inverts an output voltage thereof depending on the comparison result. Specifically, if the discharge current of the battery 15 increases to an overcurrent and the voltage of the voltage monitoring terminal VM1 increases to the reference voltage VREF3 or higher, the discharge overcurrent detection comparator 46 inverts the output voltage to High. Then, the voltage of the discharge control terminal DO becomes Low to turn OFF the N type FET 13, to thereby stop the discharge from the battery 15.

[Operation when Battery 15 is in Normal State]

The voltage of the discharge control terminal DO becomes High and the N type FET 13 is turned ON to perform the discharge from the battery 15. Further, the voltage of the charge control terminal CO becomes High and the N type FET 14 is turned ON to perform the charge to the battery 15.

[Operation Under High Temperature]

The temperature voltage generation circuit 55 generates a temperature voltage VTEMP, which is based on temperature. The reference voltage generation circuit 51 generates a reference voltage VREF4, which corresponds to an abnormal high temperature to be detected. The high-temperature detection comparator 53 compares the temperature voltage VTEMP with the reference voltage VREF4, and inverts an output voltage thereof depending on the comparison result. Specifically, the temperature voltage generation circuit 55 has such a characteristic that the temperature voltage VTEMP decreases as the temperature increases, and if the temperature voltage VTEMP decreases accompanying an increase in temperature and the temperature voltage VTEMP becomes equal to or lower than the reference voltage VREF4, the output voltage of the high-temperature detection comparator 53 becomes High. In other words, if the temperature increases to the abnormal high temperature or higher, the output voltage of the high-temperature detection comparator 53 becomes High. Then, a voltage of the output terminal DET becomes High so that the voltage of the charge control terminal CO is controlled to Low to turn OFF the N type FET 14, to thereby stop the charge to the battery 15.

[Operation Under Low Temperature]

The reference voltage generation circuit 52 generates a reference voltage VREF5, which corresponds to an abnormal low temperature to be detected. The low-temperature detection comparator 54 compares the temperature voltage VTEMP with the reference voltage VREF5, and inverts an output voltage thereof depending on the comparison result. If the temperature decreases to the abnormal low temperature or lower, the output voltage of the low-temperature detection comparator 54 becomes High. Then, the voltage of the output terminal DET becomes High so that the voltage of the charge control terminal CO is controlled to Low to turn OFF the N type FET 14, to thereby stop the charge to the battery 15.

[Operation Under Normal Temperature]

The voltage of the output terminal DET is Low and hence the temperature switch IC 12 does not control the voltage of the charge control terminal CO.

With this configuration, when the battery 15 enters the overdischarge state, the temperature switch IC 12 included in the battery pack 10 monitors the voltage of the voltage monitoring terminal VM2 provided to the external connection terminal EB−, rather than a voltage of a terminal of the battery protection IC 11 for use in communication with the temperature switch IC 12, and then shuts down. Therefore, the battery protection IC 11 included in the battery pack 10 does not require an additional terminal for use in communication with the temperature switch IC 12.

Further, when the battery 15 enters the overdischarge state, the battery protection IC 11 shuts down. The temperature switch IC 12 detects, by using the voltage monitoring terminal VM2, that the battery 15 has entered the overdischarge state, and then also shuts down. Therefore, the battery pack 10 is reduced in current consumption.

Still further, when the battery 15 enters the overdischarge state, the voltage of the external connection terminal EB− is changed from around the ground voltage VSS to around the power supply voltage VDD, with the result that the PMOS transistor 61 is turned OFF and the node of the enable signal en2 is pulled down by the switch 62 and the resistive element 63. The enable signal en2 accordingly becomes Low. Therefore, a noise component of the voltage of the external connection terminal EB− is less likely to cause an erroneous change of the enable signal en2 to Low.

Figure 4:
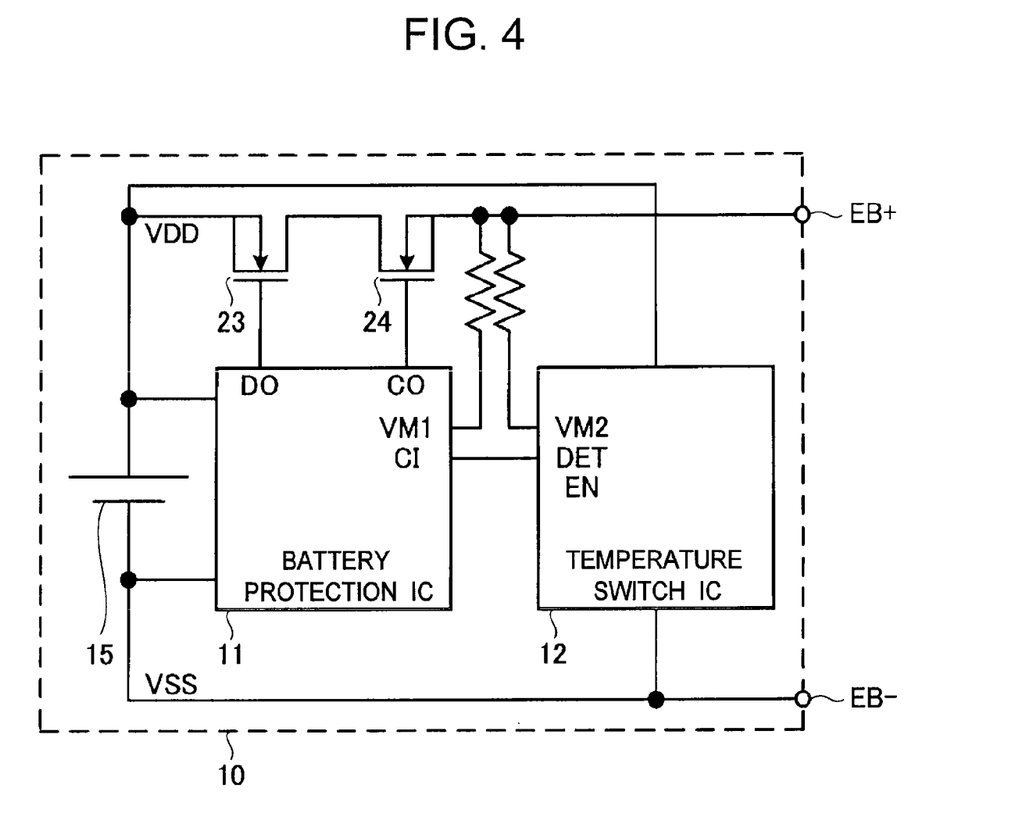
FIG. 4 is a block diagram illustrating another battery pack.

Note that, in FIG. 1, the N type FETs 13 and 14 are disposed between the external connection terminal EB− and the negative terminal of the battery 15. Alternatively, however, as illustrated in FIG. 4, P type FETs 23 and 24 may be disposed between the external connection terminal EB+ and the positive terminal of the battery 15.

Further, in FIG. 1, the voltage monitoring terminal VM2 of the temperature switch IC 12 is connected to the external connection terminal EB− via the resistor 17. Alternatively, however, although not illustrated, the voltage monitoring terminal VM2 may be connected to the voltage monitoring terminal VM1 of the battery protection IC 11, which eliminates the need to provide the resistor 17. As a result, the number of parts in the battery pack 10 is reduced.

Further, although not illustrated, the resistor 16 may be eliminated under a situation in which a negligibly small current flows into the voltage monitoring terminal VM1.

Still further, although not illustrated, the resistor 17 may be eliminated under a situation in which a negligibly small current flows into the voltage monitoring terminal VM2.

Further, although not illustrated, the discharge overcurrent detection comparator 46 may be eliminated under a situation in which the specifications of the battery pack 10 allow for the elimination of the discharge overcurrent detecting function included in the protecting function of the battery pack 10.

Further, in FIG. 2, the voltage of the control terminal CI controls the overcharge detection comparator 45. Alternatively, however, although not illustrated, the voltage of the control terminal CI may control a logic circuit disposed between the output terminal of the overcharge detection comparator 45 and the gate of the N type FET 14.

Further, in FIG. 3, the comparator 60 is formed by the PMOS transistor 61, the switch 62, and the resistive element 63. Alternatively, however, although not illustrated, the comparator 60 may be formed by a reference voltage generation circuit for generating a reference voltage, a voltage dividing circuit for dividing the voltage of the voltage monitoring terminal VM2 and outputting the divided voltage, and a differential amplifier circuit for comparing the reference voltage and the divided voltage.

Further, the logic circuit 30 is not limited to the one described above and, although not illustrated, circuit design thereof is made as appropriate.

Further, although not illustrated, the enable terminal EN and the logic circuit 30 may be eliminated under a situation in which the specifications of the battery pack 10 allow for the elimination of the enable terminal EN and the logic circuit 30.

Still further, although not illustrated, the low-temperature detection comparator 54 may be eliminated under a situation in which the specifications of the battery pack 10 allow for the elimination of the low-temperature detecting function included in the protecting function of the battery pack 10.

Still further, similarly to the above, the high-temperature detection comparator 53 may be eliminated.

Further, the following circuit designs may be made appropriately on the temperature switch IC 12: a temperature coefficient of the temperature voltage VTEMP based on a PNP bipolar transistor or an NPN bipolar transistor; the respective connection destinations of the non-inverting input terminal and the inverting input terminal of the high-temperature detection comparator 53; the respective connection destinations of the non-inverting input terminal and the inverting input terminal of the low-temperature detection comparator 54; and the presence/absence of an inversion logic circuit provided at a subsequent stage of each comparator, so that the voltage of the output terminal DET is changed to High or Low when the temperature switch IC 12 detects an abnormal temperature.

Further, the temperature switch IC 12 is not limited to the one described above and, although not illustrated, may be another control IC including the comparator 60 and the logic circuit 30. The control IC controls the battery pack 10 on a given occasion and, when the battery 15 enters the overdischarge state, the control IC monitors the voltage of the voltage monitoring terminal VM2 provided to the external connection terminal EB−, to thereby shut down.

Further, in FIG. 2, the reference voltage generation circuits 41 to 43 are provided and output the reference voltages VREF1 to VREF3, respectively. Alternatively, however, although not illustrated, a single reference voltage generation circuit may be provided and output the reference voltages VREF1 to VREF3. The same is applied to the reference voltage generation circuits 51 and 52 of FIG. 3.

Further, in FIG. 1, when the temperature reaches to the abnormal temperature, the temperature switch IC 12 controls the battery pack 10 via the battery protection IC 11. Specifically, the temperature switch IC 12 controls to turn OFF the N type FET 14 via the battery protection IC 11. Alternatively, however, although not illustrated, when the temperature reaches to the abnormal temperature, the temperature switch IC 12 may control another FET to control the N type FET 14 to be turned OFF. For example, the another FET has a gate provided to the output terminal DET, a source provided to the external connection terminal EB−, and a drain provided to the gate of the N type FET 14. In this case, when the temperature reaches to the abnormal temperature, the voltage of the output terminal DET becomes High to turn ON the another FET, to thereby turn OFF the N type FET 14.

What is claimed is:

1. A battery pack, comprising:
   a first external connection terminal and a second external connection terminal;
   a battery;
   a discharge control FET and a charge control FET which are disposed in series between the battery and the second external connection terminal;
   a battery protection IC for monitoring a voltage of the battery to detect that the voltage of the battery is equal to or lower than an overdischarge voltage, so as to turn OFF the discharge control FET and shut down, and for monitoring the voltage of the battery to detect that the voltage of the battery is equal to or higher than an overcharge voltage, so as to turn OFF the charge control FET, wherein the battery protection IC comprises a first voltage monitoring terminal coupled to the second external connection terminal; and a control IC for controlling the battery pack on a given occasion, the control IC comprising a second voltage monitoring terminal coupled to the second external connection terminal, the control IC operable to monitor a voltage of the second voltage monitoring terminal to detect that the battery enters an overdischarge state and then shut down, whereby the battery protection IC comprises no terminal for communicating with the control IC regarding the voltage of the battery;

the control IC comprising:

a comparator coupled to the second voltage monitoring terminal;

a logic circuit coupled to the comparator and operable to output an enable signal;

a temperature voltage generating circuit operable to receive the enable signal;

a reference voltage generating circuit operable to receive the enable signal; and a temperature detection comparator operable to output a detection signal based on a temperature voltage from the temperature voltage generating circuit and a reference voltage from the reference voltage generating circuit.

2. A battery pack according to claim 1, wherein the battery protection IC monitors a voltage of the first voltage monitoring terminal to detect that a discharge current of the battery is equal to or larger than a discharge overcurrent, and turns OFF the discharge control FET.

3. A battery pack according to claim 2, wherein the control IC comprises a comparator for detecting that the voltage of the second voltage monitoring terminal is equal to a predetermined voltage when the voltage of the battery is equal to or lower than the overdischarge voltage.

4. A battery pack according to claim 3, wherein the comparator comprises:

a MOS transistor which is turned OFF when the voltage of the second voltage monitoring terminal becomes equal to the predetermined voltage; and a resistive element connected in series to the MOS transistor.

5. A battery pack according to claim 3, wherein the comparator comprises:

a reference voltage generation circuit for generating a reference voltage;

a voltage dividing circuit for dividing the voltage of the second voltage monitoring terminal and outputting the divided voltage; and a differential amplifier circuit for comparing the reference voltage and the divided voltage.

6. A battery pack according to claim 1, wherein the second voltage monitoring terminal is connected to the second external connection terminal via a second resistor.

7. A battery pack according to claim 2, wherein the first voltage monitoring terminal is connected to the second external connection terminal via a first resistor, and wherein the second voltage monitoring terminal is connected to the second external connection terminal via a second resistor.

8. A battery pack according to claim 2, wherein the first voltage monitoring terminal is connected to the second external connection terminal via a first resistor and is also connected to the second voltage monitoring terminal.

9. A battery pack according to claim 1, wherein the control IC comprises a temperature switch IC for controlling the battery pack when a temperature reaches to at least one of an abnormal high temperature and an abnormal low temperature.

* * * * *